Aug. 13, 1957 J. D. BROWN 2,802,235
LATCH-OPERATED SAFETY SWITCH FOR STEAK MACHINE
Filed Sept. 11, 1953 3 Sheets-Sheet 1
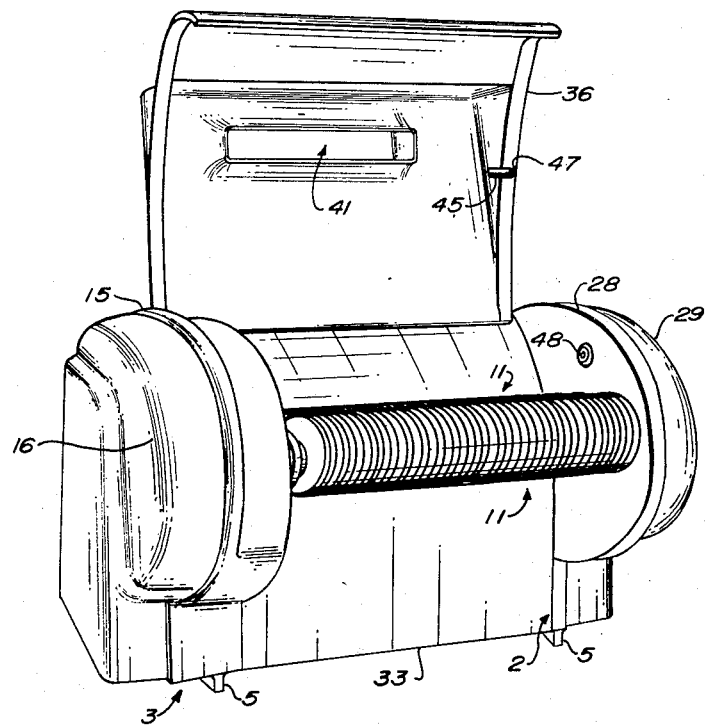
Fig. I
INVENTOR.
JAMES D. BROWN
BY
Marshall, Marshall & Yeasting
ATTORNEYS

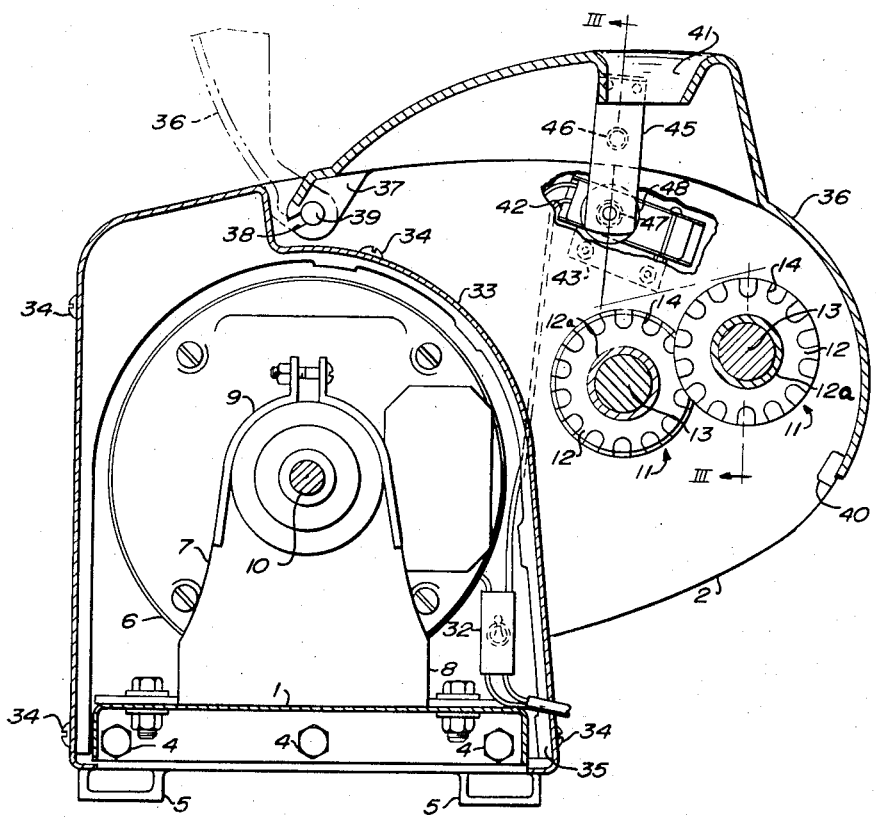
Fig. II
INVENTOR.
JAMES D. BROWN

Aug. 13, 1957 J. D. BROWN 2,802,235
LATCH-OPERATED SAFETY SWITCH FOR STEAK MACHINE
Filed Sept. 11, 1953 3 Sheets-Sheet 3
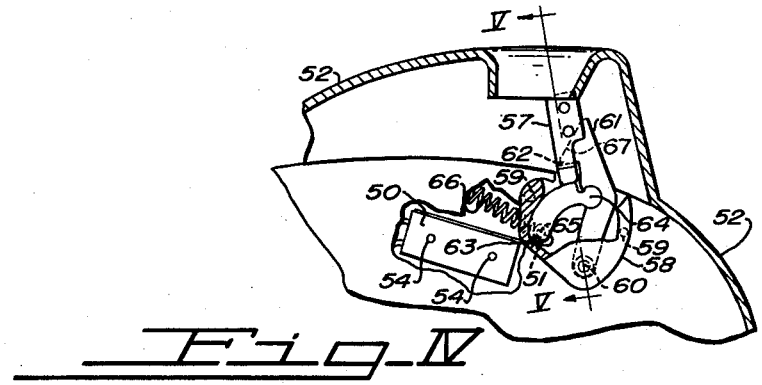
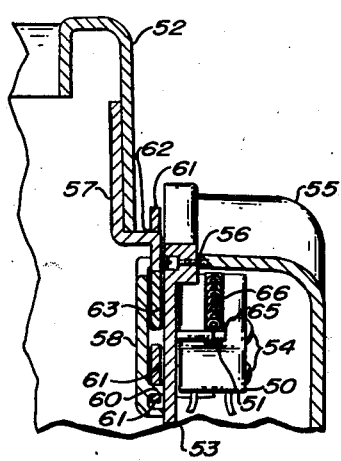
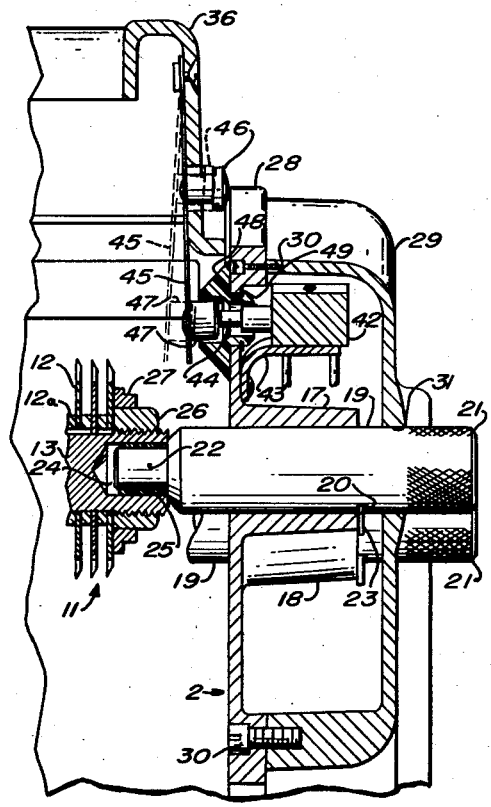
INVENTOR.
JAMES D. BROWN

United States Patent Office 2,802,235
Patented Aug. 13, 1957

2,802,235

LATCH-OPERATED SAFETY SWITCH FOR STEAK MACHINE

James D. Brown, Toledo, Ohio, assignor to Toledo Scale Company, Toledo, Ohio, a corporation of New Jersey Application September 11, 1953, Serial No. 379,575

4 Claims. (Cl. 17—26)

This invention relates to steak machines and in particular to a combination safety device for a steak machine which makes the lifting of the cover lid of the machine difficult and which renders the machine inoperative when the cover lid is lifted or removed.

Steak machines are employed for rendering more palatable the less expensive and less desirable cuts of meat and for blending together small bits of meat into larger more appetizing steaks and cutlets. Steak treating or blending machines of this type usually are equipped with a pair of parallel intermeshing treating rolls each of which consists of an arbor or shaft upon which are mounted a plurality of disk-shaped cutters having teeth on their peripheries. By rotating the two rolls toward each other the teeth of the disk-shaped cutters engage and cut into the meat to be treated, pulling it through between the rolls and making a multiplicity of short incisions in each surface of the meat. These short incisions sever the connecting fibers and sinews and make the meat more tender and, consequently, more palatable. Such machines are equipped with cover lids which are normally closed during use of the machines. However, if the cover lid of a steak machine is lifted or removed and the machine is allowed to operate, the rotating intermeshing treating rolls having a plurality of disk-shaped cutters instantly become extremely hazardous to fingers and hands.

The principal object of this invention is to provide, in a motor driven steak machine, a safety device operable when the cover lid of the steak machine is closed in covering position for conditioning a circuit to energize the motor, and operable when the cover lid is opened to condition the circuit to deenergize the motor.

A further object of the invention is to provide, in a motor driven steak machine, a combination safety latch device operable when the cover lid of the steak machine is closed in covering position for conditioning a circuit to energize the motor and for preventing easy lifting of the cover lid, and operable when the cover lid is opened to condition the circuit to deenergize the motor.

These and other objects and advantages will be apparent from the following description.

According to the invention, means are provided in a motor driven steak machine for latching a cover lid to the housing of the machine which means for latching are operable when the cover lid is closed for conditioning a circuit to energize the motor and operable when the cover lid is opened or removed to condition the circuit to deenergize the motor.

A preferred embodiment and a second embodiment of the invention are illustrated in the accompanying drawings.

In the drawings:

Figure I is a perspective view of a steak machine embodying the preferred species of the invention.

Figure II is an end elevational view with parts shown in section of a steak machine embodying the preferred species of the invention.

Figure III is a sectional view taken substantially along the line III—III of Figure II.

Figure IV is an end elevational view of a second embodiment of the invention mounted on a steak machine, certain parts being broken away and other parts shown in section to more clearly indicate their cooperation.

Figure V is an enlarged sectional view taken along the line V—V of Figure IV.

These specific figures and the accompanying description are intended merely to illustrate the invention but not to impose limitations on the claims.

The steak machine which is illustrated in the drawings and which embodies the instant invention is a structure comprised of several component parts secured together and erected around a formed motor base 1 (Figure II) which extends horizontally between a pair of upright end frames 2 and 3 (Figure I) which are secured at their lower ends to the end flanges of the motor base 1 by a plurality of bolts 4 (Figure II) to form a frame for the machine. Feet 5, on which the machine is supported, are cast as integral parts of the end frames 2 and 3. A motor 6 is mounted in a substantially U-shaped frame 7 which is bolted to the motor base 1 and has two upstanding arms 8, one on each side of the motor, the upper ends of which cooperate with rubber-lined clamps 9 that are tightened around cylindrical bosses formed at the ends of the motor 6.

A shaft 10 of the motor 6 extends longitudinally from the motor and is adapted to drive a pair of tenderizing members or rolls 11 comprising a plurality of disk-shaped toothed cutting knives or cutters 12 mounted on knife bearing shafts or arbors 13. The knives 12 which alternate on the arbors 13 with spacing collars 12a have a plurality of teeth 14 formed about their circumferences. The end frame 3 has a flange 15 which extends around its edge and is visible from the exterior of the machine, thus forming a part of the exterior design. An end bell 16 is secured to the outside of the end frame 3 by a plurality of bolts which are threaded through the end frame 3 and into bosses cast on the interior of the end bell 16. The end bell 16 forms the exterior cover for the left end of the machine as viewed in Figure I.

The end frame 2 has the same contour around its edges as the end frame 3 and generally serves a similar purpose, i. e. forming one end of the machine and mounting certain portions of the mechanism. The upper forward portion of the end frame 2 has two heavy bosses 17 and 18 (Figure III). Two displaceable tenoned journals 19 are slidably mounted in the bosses 17 and 18. Each of the journals 19 has a flat milled along a portion of its length and a deeper transverse slot 20 cut at the outermost end of the flat. Each of the journals 19 has a knurled section 21 at its outermost end and a cylindrical tenon 22 on its innermost end. A locking plate 23 is fixed by screws to a web extending between the two bosses 17 and 18. The plate 23 has squared ends which project over the lips of the bosses 17 and 18 into the spaces made available by the flats which are milled on the sides of the journals 19. Thus, when the journals 19 are in inserted position they can be rotated slightly until the slot 20 engages around the edge of the locking plate 23 to lock the journals in place.

Each tenon 22 extends into a counterbored socket 24 formed in the right ends of the arbors 13. A sleeve bearing 25 is fitted in each socket 24 for the reception of one of the tenons 22. A nut 26 loosely surrounded by a bushing 27, is threaded onto the right end of each arbor 13 to clamp the entire set of knives 12 and spacing collars 12a tightly in position on the arbors 13. The left end of each of the arbors 13 is journaled in the end frame 3 (Figure I).

The end frame 2 has a flange 28 around its edge similar to the flange 15 on the edge of the end frame 3 and an end bell 29 similar to the end bell 16 is secured to the outer end of the end frame 2 by a plurality of screws 30 threaded into bosses formed on its inner surface. The end bell 29 has two holes 31 through which the knurled sections 21 of the journals 19 extend. An opening is formed in the end bell 29 to mount a motor switch 32 for controlling the operation of the motor (Figure II) and a vertical recess in the end bell 29 accommodates the switch toggle. A formed cover 33 extends horizontally between the end frames 2 and 3 overlying the motor 6 and completely encloses the rearward portion of the space between the end frames 2 and 3 to complete together with the end bells 16 and 29 a housing enclosing the operating mechanism. The cover 33 is secured by screws 34 to a flange 35 formed around the opening in the end frame 2 and to a similar flange formed on the end frame 3.

The space between the end frames 2 and 3 and in front of the formed cover 33, that is, the space outside the housing in which the tenderizing rolls 11 are mounted, is enclosed from above by a cover lid 36. At the rear corners of the cover lid 36 (Figure II) there are formed two downwardly extending lugs 37 in which are cut keyhole shaped slots 38. The slots 38 are engageable with hinge pins 39 to form hinges for the cover lid 36. When the cover lid 36 is in place on the machine its forward lower edge is supported by a pair of lugs 40 formed on the exterior walls of the end frames 2 and 3. When the cover lid 36 is raised it takes the position shown by the broken lines in Figure II. The cover lid 36 has a transverse chute-like opening 41 which extends longitudinally above the tenderizing rolls and through which pieces of meat to be treated are inserted into the machine.

When it is desired to swing the cover lid 36 up and back, as shown in Figure I, to remove the tenderizing rolls 11 for cleaning or other purposes, it is important that the machine be shut off, as the rotating tenderizing rolls 11 are extremely dangerous to fingers and hands. Heretofore, accidents have been caused by either the failure to shut-off the motor before opening the cover lid or by accidental closing of the toggle of the motor switch after the cover lid was raised, although heretofore the switch toggle has been accommodated in a vertical recess flanked by curved flanges to minimize such accidental operation.

Referring to Figure II, illustrating the preferred embodiment of the invention, in order to prevent injury to fingers or hands by accidental contact with rotating tenderizing rolls when the cover lid 36 is raised, a safety switch 42 is wired in series with the motor 6 and the motor switch 32 which safety switch 42 is adapted to complete the circuit energizing the motor 6, providing the motor switch 32 is closed, when the cover lid 36 is closed and is adapted to shut-off the motor when the cover lid is opened.

The safety switch 42 is operated by a latch, hereinafter described, which in addition to opening the switch to render the machine inoperative when the cover lid 36 is lifted or removed also makes the lifting of the cover lid difficult.

Referring to Figure III, illustrating the preferred embodiment of the invention in detail, the safety switch 42 is mounted on a bracket 43 attached to the outside of the upper forward portion of the end frame 2 over the bosses 17 and 18. An actuating plunger or engageable portion 44 of the safety switch 42 extends through a hole drilled in the end frame 2 and is so arranged that when pressure is applied to the actuating plunger the contacts of the safety switch are closed. The safety switch 42 is enclosed by the end bell 29 and is thus not readily accessible for dismantling.

A resilient member such as a flat spring 45 (Figures I, II and III) is attached to the cover lid 36 and extends generally in the direction of movement of the cover lid. The flat spring 45 carries two projecting members or fingers 46 and 47, the first of which projects through a hole in the cover lid 36 to provide means operable from the exterior of the machine for deforming or deflecting the flat spring 45 by thumb pressure from its position shown in solid lines to its position shown in broken lines in Figure III in order to withdraw the second finger 47 from the axial opening of a tapered retaining ring or cone 48. A portion of the cone 48 extends through the hole drilled in the end frame 2 to accommodate the actuating plunger 44 of the safety switch 42 which actuating plunger is contained within the axial opening of the cone 48. A spring clip 49 fastened about the portion of the cone 48 extending through the hole in the end frame 2 holds the cone 48 in place on the end frame.

The position and shape of the second finger 47 and the axial opening of the cone 48 provide an effective latch to make it difficult to raise the cover lid 36 while the second finger 47 and the cone 48 are engaged. The cone 48 is tapered toward the second finger 47 so as to automatically guide the finger into the axial opening in the cone 48 to switch-operating position when the cover lid 36 is lowered without necessity of manually depressing the flat spring 45. When the second finger 47 is in switch-operating position, as shown in Figure III in solid lines, the actuating plunger 44 of the safety switch 42 is depressed to close the safety-switch contacts, thus conditioning the electrical circuit to energize the motor 6.

When the cover lid 36 is permitted to be raised by deforming the flat spring 45 by thumb pressure applied to the first finger 46 to release the second finger 47 from the axial opening of the cone 48, the pressure upon the actuating plunger 44 is relieved and the contacts of the safety switch 42 open thus shutting off the motor 6 of the machine. Accidental operation of the machine is prevented when the cover lid 36 is raised, since the actuating plunger 44 of the safety switch 42 is recessed in the axial opening of the cone 48.

A second embodiment of the invention is illustrated in Figures IV and V. This embodiment is not preferred because it is more expensive to manufacture and more difficult to mount on a steak machine than the preferred embodiment hereinbefore described. However, the second embodiment of the invention provides a very effective latch for the cover lid and renders the steak machine inoperative when the cover lid is lifted or removed.

Referring to Figures IV and V, a safety switch 50 having a contact arm 51 is wired in series with a motor and a motor switch and is mounted in a similar position on a steak machine as was the preferred embodiment of the invention hereinbefore described. The safety switch 50 is adapted to start the motor, providing the motor switch is closed, when a cover lid 52 is closed and is adapted to shut-off the motor when the cover lid 52 is opened.

The safety switch 50 is operated by a latch, hereinafter described, which in addition to operating the switch to render the steak machine inoperative when the cover lid 52 is lifted or removed also makes the lifting of the cover lid impossible unless the latch is released.

The safety switch 50 is attached to the outside of the upper forward portion of an end frame 53 by means of screws 54 which project through the body of the safety switch into the end frame 53. The contact arm 51 of the safety switch 50 extends above the switch and is so arranged that when pressure is applied to the contact arm 51 the contacts of the safety switch are closed. The safety switch 50 is enclosed by an end bell 55 secured to the end frame 53 by a plurality of screws 56 and is thus not readily accessible for dismantling.

The latch includes a flat Z-shaped finger 57 rigidly attached to the cover lid 52 and extending generally in the direction of movement of the cover lid, and a casting 58 containing the actuating parts of the latch which casting 58 is mounted on the inside of the end frame 53 by means of screws 59 projecting from the outside of the end frame 53 through the end frame into the casting. The screws 54 holding the safety switch 50 in place on the end frame and the screws 59 holding the casting 58 in place on the end frame are accessible only by removing the end bell 55 from the steak machine which is quite difficult, requiring considerable dismantling of the machine.

A boss 60 of the casting 58 rotatably supports a lock arm 61 having a locking face 62 cooperating with the Z-shaped finger 57 when the cover lid 52 is closed and a cam surface 67 for deflecting the arm as the cover approaches its closed position. When the locking face 62 of the lock arm 61 is engaged with the Z-shaped finger 57, as shown in Figure IV, it is impossible to lift the cover lid 52. When the lock arm 61 is moved by finger pressure to the right (Figure IV), causing it to rotate clockwise about the boss 60 of the casting 58 (Figure IV), the locking face 62 becomes disengaged from the Z-shaped finger 57 allowing the cover lid 52 to be lifted.

A switch operating link 63 is pivotally attached to the lock arm 61 by a ball and socket connection 64. The link 63 carries a switch actuating arm 65 which presses on the contact arm 51 of the safety switch 50 whenever the cover lid 52 is closed to operate the safety switch 50, since when the cover lid 52 is closed the Z-shaped finger 57 carried by the cover lid moves the switch operating link 63 downward to force the switch actuating arm 65 of the link onto the contact arm 51 of the safety switch. A resilient member or spring 66, one end of which is attached to the end frame 53, is attached to an end of the switch operating link 63 remote from its ball and socket connection 64 to raise the switch operating link 63 in such position as to not make contact with the contact arm 51 of the safety switch 50, when the cover lid is raised.

When the cover lid 52 is closed, as shown in Figure IV, the end of the Z-shaped finger 57 presses upon the top of the switch operating link 63 and forces the link downward so that the switch actuating arm 65 of the link operates the safety switch 50 by moving the contact arm 51 of the switch downward. Movement of the link pulls the lock arm 61 causing the locking face 62 of the arm to automatically move over the Z-shaped finger securely locking the cover lid 52 in place. Finger pressure moving the lock arm 61 to the right (Figure IV) will pull the switch operating link 63 away from the contact arm 51 of the safety switch 50 electrically disconnecting the motor of the steak machine even while the cover lid 52 is still closed.

Accidental operation of the steak machine is prevented when the cover lid 52 is raised, since when the cover lid is opened or removed, the spring 66 holds the switch operating link 63 away from the contact arm 51 of the safety switch 50 thus continuing to keep the motor shut-off which originally shut-off as soon as finger pressure moved the lock arm 61. Accidental movement, therefore, of the lock arm 61 in either direction, when the cover lid 52 is opened or removed, will not start the motor of the machine, since the spring 66 holds the switch operating link 63 away from the contact arm 51 of the safety switch 50 as long as the cover lid 52 is open or removed. The only time the motor will operate to drive the tenderizing rolls of the steak machine is when the cover lid 52 is closed forcing the Z-shaped finger 57 onto the switch operating link 63, and when the lock arm 61 is in latching position, as shown in Figure IV.

Various modifications in the specific structures may be made without departing from the spirit and scope of the invention.

Having described the invention, I claim:

1. In a meat tenderizing machine having a housing, a motor within the housing, tenderizing rolls that are mounted for rotation outside of the housing and that are driven by the motor and a movable cover that is carried by the housing and that is adapted to enclose the tenderizing rolls, in combination, first latch means mounted on the housing, second latch means mounted on the movable cover and engaging the first latch means to lock the cover in closed position, a resilient portion included in one of the latch means conditioned to urge the latch means into locking engagement, a cam surface on at least one of the latch means for deflecting the latch means to unlatched position against the bias of the resilient portion as the cover approaches its closed position, and a safety switch located in the housing and having an operator located in the path of a portion of the resiliently urged latch means for operating the switch as the latch means reach locking engagement.

2. In a meat tenderizing machine having a housing, a motor within the housing, tenderizing rolls that are mounted for rotation outside of the housing and that are driven by the motor and a movable cover that is carried by the housing and that is adapted to enclose the tenderizing rolls, in combination, a latch-operated safety switch that is located within the housing and that is operatively connected to the motor and that includes an actuating plunger, and a latch which comprises a first member that is fixedly attached to the housing and that includes an opening within which the actuating plunger of the safety switch is located in recessed position to prevent accidental operation of the switch and a resilient second member fixedly attached to the movable cover, part of the resilient member being automatically guided into the opening in the first member when the cover is closed both to operate the actuating plunger of the safety switch and to latch the cover to the housing for preventing easy opening of the cover.

3. The combination according to claim 2 wherein means, finger operable from the exterior of the machine, is provided for bending the resilient member to release it from the opening in the first member to condition the cover for opening.

4. A device according to claim 1 in which the first latch means comprises a hooked member pivotally mounted on the housing and a switch actuator pivotally attached to the hooked member and engageable with the switch operator, the second latch means comprises a portion of the cover that has a first surface engageable by the hooked member and a second surface in guiding engagement with the switch actuator, and the resilient portion comprises a tension spring connected between the switch actuator and the housing to draw the hooked member into latching engagement with the first surface when the cover is in closed position and the switch actuator out of operative engagement with the switch operator when the cover is in opened position.

References Cited in the file of this patent

UNITED STATES PATENTS

| | | |
|---|---|---|
| 998,866 | Watson et al. | July 25, 1911 |
| 1,756,181 | Curtis | Apr. 29, 1930 |
| 1,837,244 | Watson | Dec. 22, 1931 |
| 2,293,963 | Bakewell | Aug. 25, 1942 |
| 2,438,184 | Pfister | Mar. 23, 1948 |
| 2,618,282 | Stanitz et al. | Nov. 18, 1952 |

FOREIGN PATENTS

| | | |
|---|---|---|
| 619,117 | Great Britain | Mar. 3, 1949 |